United States Patent [19]
Howard

[11] Patent Number: 4,779,238
[45] Date of Patent: Oct. 18, 1988

[54] METHOD FOR FAST SLANT STACK OF SEISMIC DATA

[75] Inventor: Michael S. Howard, Ponca City, Okla.

[73] Assignee: Conoco Inc., Ponca City, Okla.

[21] Appl. No.: 37,666

[22] Filed: Apr. 13, 1987

[51] Int. Cl.[4] ............................................. G01V 1/32
[52] U.S. Cl. ...................................... 367/63; 364/421
[58] Field of Search ............................ 367/38, 59, 63; 364/421

[56] References Cited
U.S. PATENT DOCUMENTS 4,628,492  12/1986  Winney .................................. 367/63
4,648,039  3/1987   Devaney et al. ....................... 364/421

Primary Examiner—Thomas H. Tarcza
Assistant Examiner—Ian J. Lobo
Attorney, Agent, or Firm—Ron J. Carlson; Cortlan R. Schupbach; Frank J. Kowalski

[57] ABSTRACT

A method for processing seismic data in the x−t domain to derive a slant stack in the p−tau domain wherein partial slant stacks are computed over a plurality of small groups of traces which are iteratively merged using linear interpolation into successively larger groups of traces to exhibit the p−tau data characteristics.

8 Claims, 6 Drawing Sheets $p = 3\Delta p_3 = (3/8)\Delta t/\Delta x$

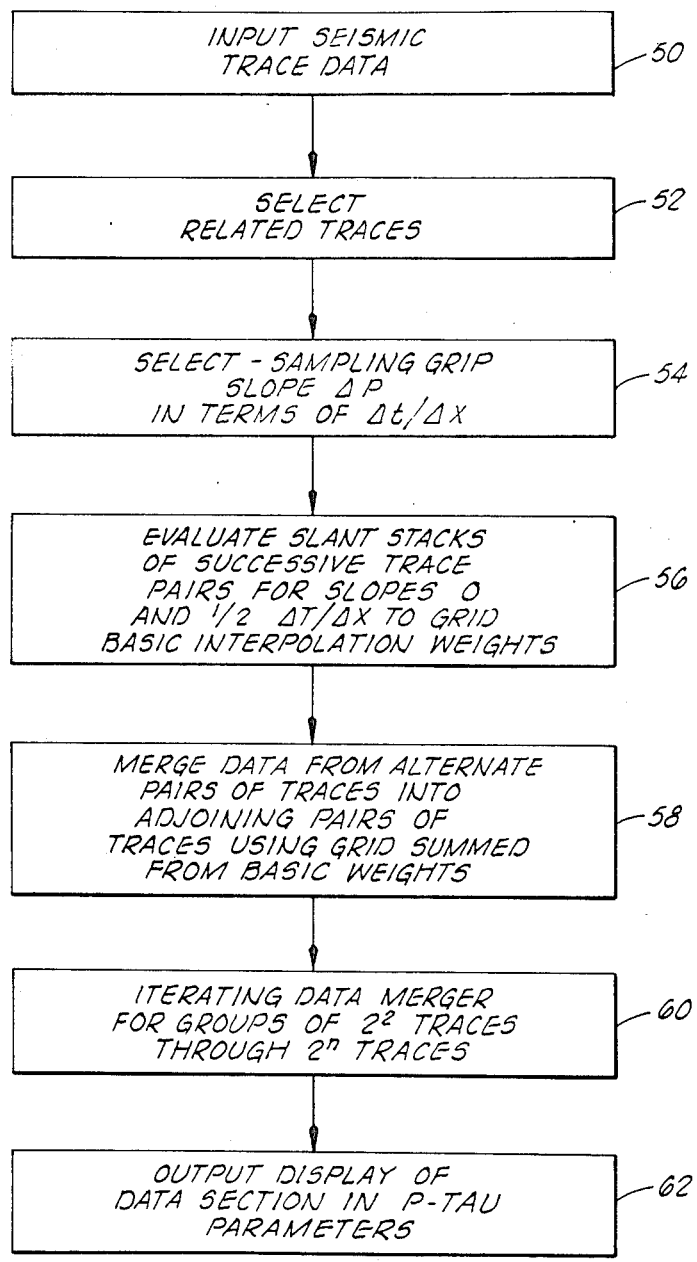

METHOD FOR FAST SLANT STACK OF SEISMIC DATA

BACKGROUND OF THE INVENTION

1. Field of the Invention

The invention relates generally to a computer process for fast slant stacking of seismic data for transform to a p—tau output format, such method enabling a considerable reduction in computation time thereby to enable slant stack of data much more economically.

2. Description of the Prior Art

The prior art includes a number of different programmed methods for carrying out the full slant stack operation in transform of seismic data for p—tau presentation. The prior methods each function to carry out a total slant stack which requires a very great amount of computer time. The inordinate amount of computation time and the attendant expense has considerably lessened the availability of slant stack data operations which are known to be a useful tool in making certain seismic data evaluations.

SUMMARY OF THE INVENTION

The present invention relates to a computational method for performing fast slant stack of seismic data which enables output of a p—tau display of data with a reduction in computation time from $N^3$ to something proportional to $N^2 \log N$, where N is the size of the transform. The slant stack method computes partial slant stacks over small groups of traces and then iteratively merges them to give partial slant stacks over successively larger groups of traces. Sampling of the trace data is effective at predetermined grid points of a preselected sampling grid and linear interpolation is used to establish interim grid point data.

Therefore, it is an object of the present invention to provide a method for fast slant stack that can be considered for use in data analysis in a vastly improved economic setting.

It is a further object of the invention to provide a p—tau transform that is fast in terms of number of numerical calculations required.

It is also an object of the invention to provide a fast slant stack program that can perform slant stack on seismic data shot profiles a considerable number of times faster than previous slant stack programs.

It is still further an object of the present invention to provide a fast slant stack program that is favorably considered for use in combination with other specific seismic data analyses due to the greatly increased economy of operation.

Finally, it is an object of the present invention to provide a novel numerical manipulation for deriving p—tau seismic data from seismic shot profile data with specific grid size.

Other objects and advantages of the invention will be evident from the following detailed description when read in conjunction with the accompanying drawings which illustrate the invention.

BRIEF DESCRIPTION OF THE DRAWINGS

FIG. 4B is a grid pattern and stacking weight distribution for another grid array of the present invention;

FIG. 5 is a flow diagram of the basic fast slant stack process.

DETAILED DESCRIPTION OF THE INVENTION

Figure 1A:
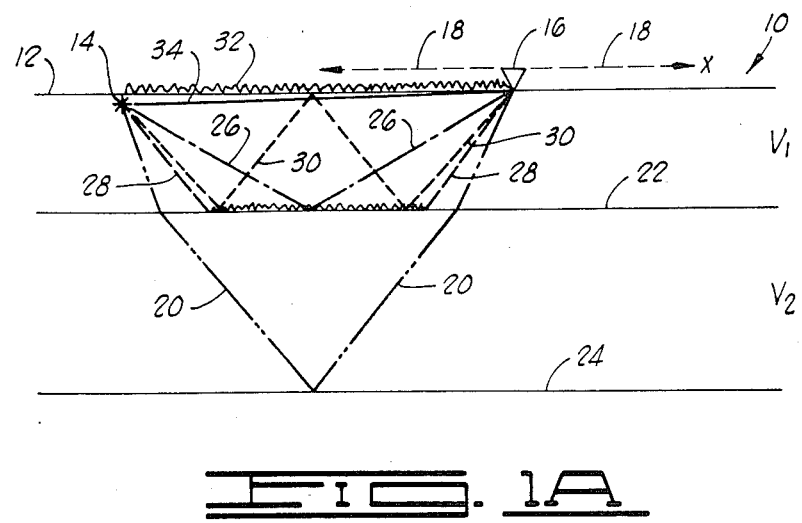
FIG. 1A is a cross-sectional view in idealized form of an earth section showing seismic shot ray paths as they might occur.

The seismic data slant stack is a Radon transformation which transforms record space data as a function of offset x and arrival time t into the domain of ray parameter or slope p and intercept time tau. Such slant stacks may be referred to variously as p—tau transforms, plane wave decomposition, or slant line or wave front synthesis. The advantage of slant stacks is that while each trace represents a one-dimensional problem, the multi-dimensional information contained in the data is still available in the slant stack as a whole. That is, slant stacks allow the possibility of using simple one-dimensional techniques while retaining information that is only available from multi-dimensional data. Two examples of this are (1) multiple reflected energy, which is periodic on all slant stack traces as opposed to being periodic only for the zero-offset trace in record space, and (2) methods which separate the velocity and density profiles from the acoustic impedance. In recent years, numerous ideas for applications of slant stack have been suggested, as will be further described below, and such further applications become more readily attainable in view of the present invention.

A slant stack per se is a transformation from record space where data is described as a function of offset x and travel time t, to a description in terms of ray parameter p and intercept time $\tau$. Mathematically, it is a Radon transform of the general form $$\tilde{u}(p,\tau) = \int d\underline{x} u(\underline{x}, \tau + \underline{p} \cdot \underline{x}) \tag{1}$$

In the simplest case of transforming over one variable in a two-dimensional cartesian coordinate system, the slant stack is just the Fourier F—k (frequency-wave number) transform evaluated at $k = \omega p$.

The data slant stack has the following properties:

(1) Data with linear move-out (for example, direct arrivals and head waves) are collapsed into a single p—tau point.

(2) The normal move-out curve in p—tau space is an ellipse.

(3) The inverse transform is itself a slant stack.

(4) The slant stack corrects for geometrical spreading.

(5) For flat plane layers, the primary ellipses do not cross, and multiples are periodic in tau for all p.

It should be noted that the slant stack can be applied to any data, (shot point, mid point, point source, line source, flat layers, dipping layers, or such) in order to obtain a dip intercept decomposition of the data which has a well-defined inverse. However, to obtain simple one-dimensional results based on a plane wave interpretation, one must use a slant stack which is appropriate for the geometry of the problem. One well-known form of equation will remove cylindrical spreading and would be appropriate for a line source in a layered medium. Still other slant stack equations are effective for removal of cylindrical spreading and would be appropriate for a point source in a layered medium.

Numerically, the slant stack is the sum along lines of slope p and intercept $\tau$. The maximum contribution to the slant stack sum will be along lines which are tangent to the x−t curves, i.e. along lines with slope $$p = dt/dx \qquad (2)$$

and intercept $$\tau = t - px \qquad (3)$$

Thus, data with linear move-out are collapsed into a point in p−$\tau$ space. For normal (hyperbolic) move-out, the x−t curve is $$t^2 = t_0^2 + \frac{x^2}{v^2} \qquad (4)$$

so that $$p = x/tv^2 \text{ and } \tau = t - px \qquad (5)$$

These can be solved for x−t in terms of p−$\tau$ and inserted into the normal move-out curve (Equation 4) to give $$\tau^2 = t_0^2 (1 - p^2 v^2) = \tau_0^2 (1 = p^2 v^2) \qquad (6)$$

Thus, the normal move-out curve in p−$\tau$ space is an ellipse, and it may be noted that the zero-offset and zero-ray parameter times $t_0$ and $\tau_0$ are identical, both being the normal incidence times.

The slant stack or transformation of seismic data into the p−tau domain can be effectively utilized in many forms of seismic data interpretation, as will be further described below. However, one use that is particularly illustrative is shown in FIGS. 1A, 1B and 1C wherein the slant stack tool is used in a process for separating out certain interfering seismic data such as multiples, ground roll and the like for subsequent muting and inverse transformation thereby to clean up a seismic profile.

FIG. 1A illustrates a section of earth 10 with surface 12 having an upper stratum $V_1$, and a lower stratum $V_2$. A seismic energy source at point 14 provides repeated seismic energy input into surface 12 as a receiver array 16 receives seismic energy coming from the earth below. The seismic energy detector 16 would normally be moved systematically along surface 12 as indicated by the dash line 18 denoting offset x.

Outgoing seismic energy from source 14 is essentially omni-directional and travels through various paths. Thus, a deep-going primary reflection 20 is refracted through interface 22 for reflection from next deeper interface 24 and upward return to detector 16. A quantum of energy will also travel a direct reflected or primary path 26 for reflection from interface 22. Other secondary or seismic waves of interfering nature would consist of a refraction wave 28 which refracts and travels along interface 22 until subsequent release upward toward detector 16, as well as a multiple reflection seismic wave 30 entrained in a reverberative mode within the $V_1$ stratum. Finally, there will be present a low velocity ground roll or airwave 32, as well as a direct arrival wave 34 traveling in the earth surface weathering layer.

Figure 1B:
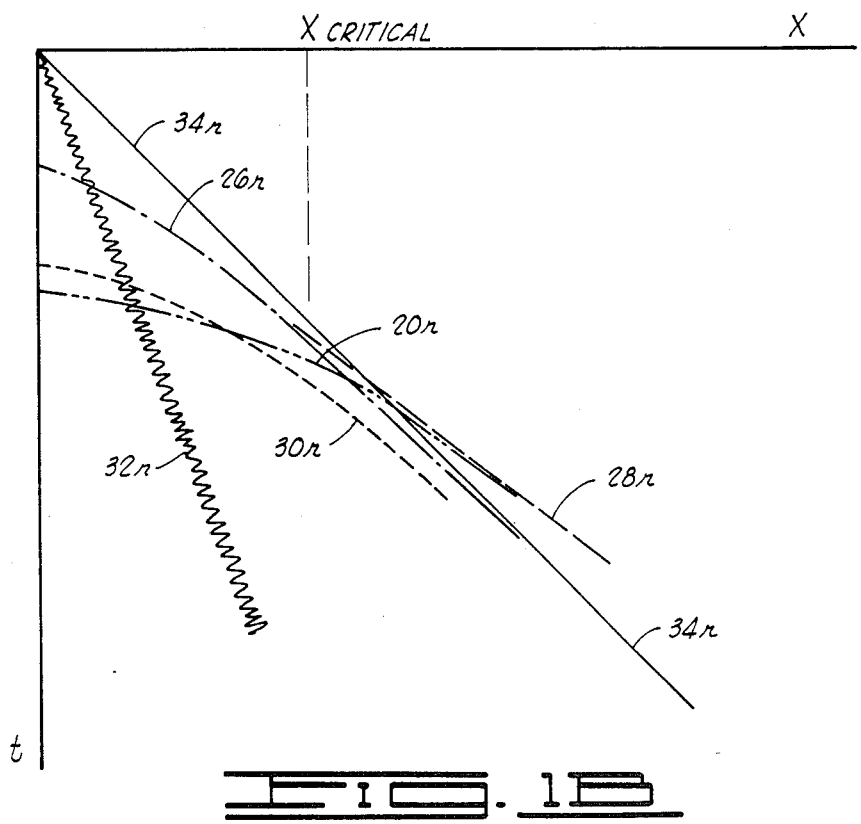
FIG. 1B is an x—t display in idealized form of received energy as detected in FIG. 1A.
Figure 1C:
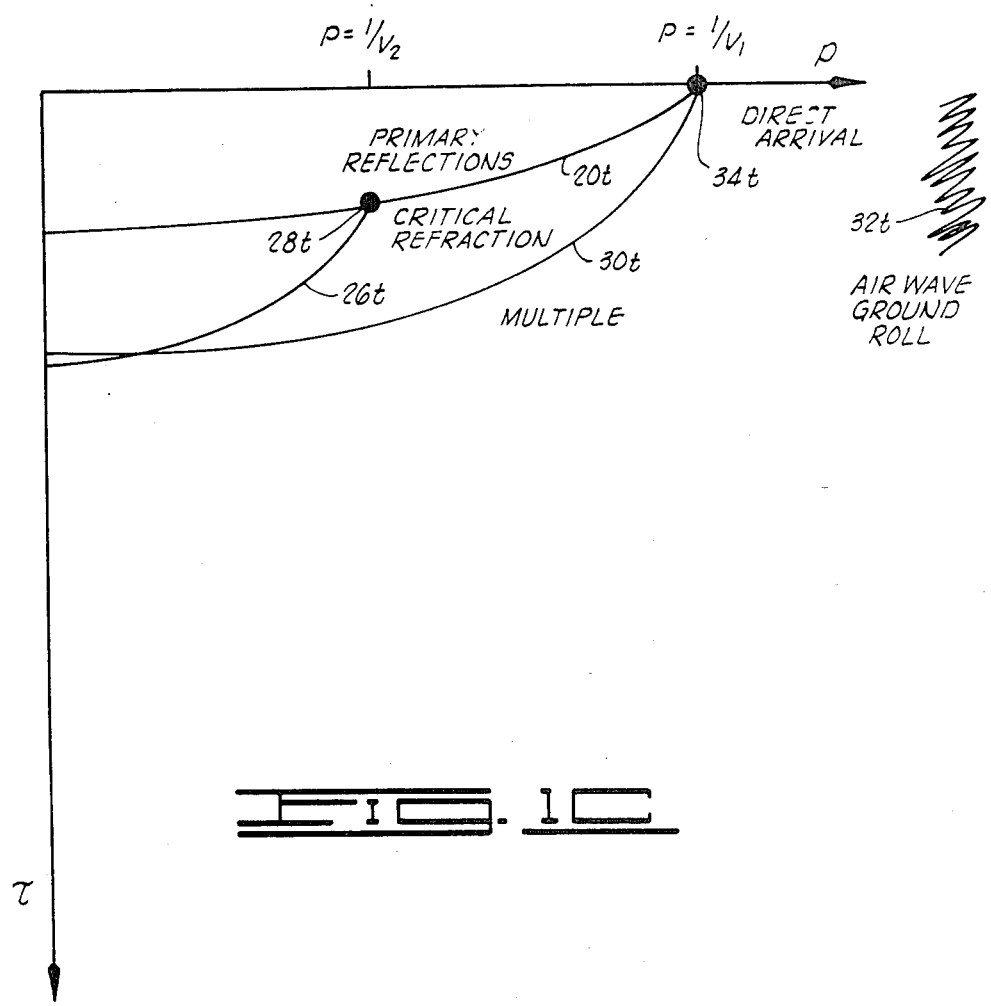
FIG. 1C is a p—tau display in idealized form of the data indicated in FIG. 1B.

FIG. 1B illustrates a detected energy display in offset x versus travel time t of the various waves of FIG. 1A as a series of seismic source energizations is received by detector 16 as moved across a selected portion of offset x. Thus, ground roll 32r (response) is very slow and distinctly displaced from the bulk of the remaining seismic energy. The direct arrival response 34r is of increased constant velocity and exhibits greater x/t ratio. The refracted wave 28 will show up as a straight line response 28r extending from the x critical dash-line in increasing, straight-line x/t progression. Finally, the remaining reflected events will show up as hyperbolic progressions, i.e. shallow reflection 26r, deep reflection 20r and multiples reflection 30r.

The x−t print out of FIG. 1B can then be transformed via slant stack, in this case by the novel fast slant stack of the present invention, to further delineate or separate the various reflection types thereby to enable extraction of the desired reflection indications. Thus, FIG. 1C shows a p−tau transform which positions the various data indications in easily separable position. The air wave 32t (transform) is disposed completely out of the main activity as is also the direct arrival 34t, a point indication. The primary reflections 26t and 20t are disposed in ordered and identifiable progression as the straight line critical refraction 28t is isolated at one point, and the interfering multiples 30t are well distinguished. Given this information, certain inverse transformation techniques may then be applied with mute of the interfering waves thereby to provide a final x−t seismic profile of only desired seismic response; and, this display too is subject to further massaging and interpretive procedures.

Figure 2:
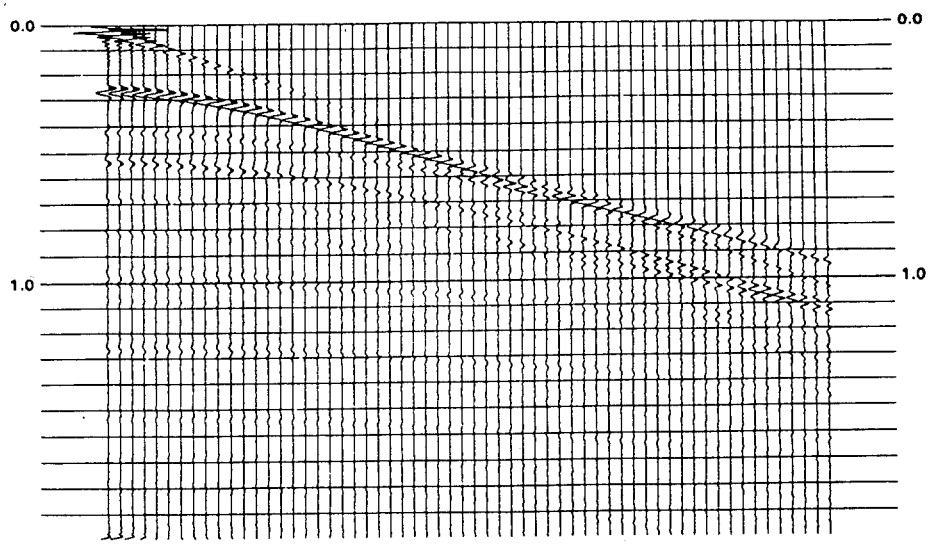
FIG. 2 is an x—t display of seismic data.
Figure 3:
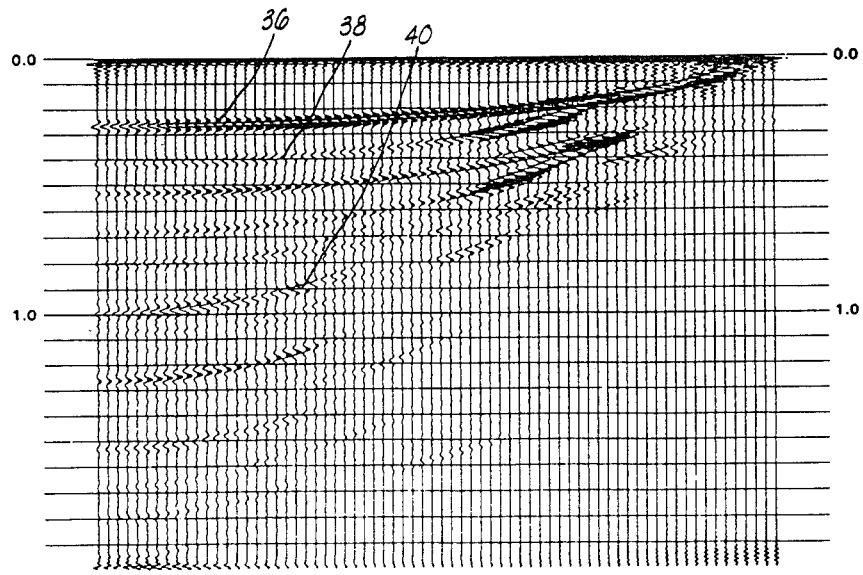
FIG. 3 is a p—tau display after slant stack of the data of FIG. 2.

FIGS. 2 and 3 provide an illustration using synthetically compiled data for a marine seismic model. Thus, FIG. 2 is an x−t display of the marine model showing the primary reflections as well as the fluid reverberations and other multiple and interference reflections. FIG. 3 then shows a slant stack of the data of FIG. 2 as primary events at 36, 38, and 40 are distinguished from the remaining clutter of multiples, mode conversion waves and the like.

Even though the slant stack of data in the p−tau domain can be a valuable tool in interpretation and processing of seismic data, it receives very limited usage due to the extreme expense involved in carrying out a normal type of slant stack. The full slant stack transform is so expensive to compute by the standard method of summing along all lines of constant slope that many applications are not considered within the economies of the operation, and this tends to prevent interest in further development of slant stack applications. The full slant stack method requires a number of computer operations proportional to $N^3$ for any array of N by N data points. The Fast Slant Stack of the present method requires only a number of operations proportional to $N^2 \log N$ for the same number of data points. This obviously can represent a very great cost savings if N is large.

The present method is based on regular sampling of data, space sampling of $\Delta x$ and time sampling of $\Delta t$, and upon linear interpolation. Rather than doing straight sums on the data for a given value of the ray parameter p, the Fast Slant Stack method iteratively constructs groups of $2^n$ traces, having ray parameters on a grid $$\Delta p = \frac{1}{2^n} \frac{\Delta t}{\Delta x} \quad (7)$$

from two smaller groups of $2^{n-1}$ traces, having ray parameters on a grid $$\Delta p = \frac{1}{2^{n-1}} \frac{\Delta t}{\Delta x} \quad (8)$$

This step may be repeated from any desired, arbitrarily small, ray-parameter grid size.

Given data u(x,t), the ordinary slant stack $\bar{u}(p,\tau)$, given by Equation (1) is calculated by stacking u along lines $t = \tau + px$ for any desired intercept time $\tau$ and slope or ray parameter p. If u is sampled on a grid $x = k\Delta x$ and $t = t\Delta t$, then $\tau + px$ will not necessarily fall on a grid point at a given x and some type of interpolation will be required. A natural unit for p is $\Delta t/\Delta x$, as for this value of p, $$\tau + px = j\Delta t + k\Delta x \Delta t/\Delta x = (j+k)\Delta t \quad (9)$$

always falls on a grid point with no further interpolation required. However, p values much smaller than $\Delta t/\Delta x$ are generally needed which require interpolation.

The present method of Fast Slant Stack is based on choosing the grid in p as $$\Delta p_n = (\tfrac{1}{2})^n \Delta t/\Delta x \quad (10)$$

and on using linear interpolation, i.e. an interpolation which gives the correct answer for linear functions. There are two consequences of this choice of $\Delta p$ that allow the Fast Slant Stack to work. First, for a given n, the positions relative to the grid points where the trace is evaluated will repeat every $2^n$ traces. This is illustrated for n=1 in FIG. 4A, which shows straight lines of slope $$p = 0\Delta p_1 = 0 \text{ and } p = 1\Delta p_1 = \frac{1}{2} \frac{\Delta t}{\Delta x} \quad (11)$$

The relative weights for the interpolation are shown at the grid points. In this case, the traces are evaluated either at the grid points or halfway between grid points, and the weights are 1 for the former and $\tfrac{1}{2}:\tfrac{1}{2}$ for the latter. For the case n=2 (FIG. 4B), the traces are only evaluated at the grid points or $\tfrac{1}{4}$, $\tfrac{1}{2}$, or $\tfrac{3}{4}$ of the way between. These correspond to weights at the grid points of 1, $\tfrac{3}{4}:\tfrac{1}{4}$, $\tfrac{1}{2}:\tfrac{1}{2}$, and $\tfrac{1}{4}:\tfrac{3}{4}$, respectively. The situation is similar for larger values of n.

Figure 4A:
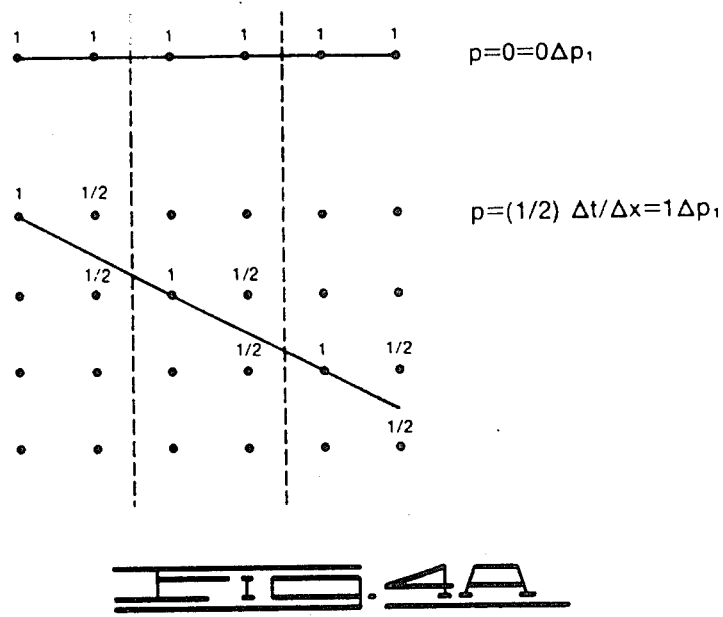
FIG. 4A is an illustration of grid points and stacking weight distribution for one grid pattern used in the present invention.

The second consequence occurs with choice of $\Delta p$ as illustrated in Equation (10) since the interpolation weights for $\Delta p_{n+1}$ are a linear combination of weights from $\Delta p$. This is shown in FIG. 4B where the stacks at $p = 0\Delta p_2$, $p = 1\Delta p_2$, and $p = 2\Delta p_2$ over $2^2 = 4$ traces are calculated from the smaller stacks at $p = 0\Delta p_1$, and $1\Delta p$ over $2^1 = 2$ traces as shown in FIG. 4A. Note that the $p = \tfrac{1}{4}\Delta t/\Delta x$ slant stack is calculated by adding together four previously calculated numbers rather than the five multiples and six adds that are required to interpolate and stack directly from the original data grid.

The Fast Slant Stack is compiled by iterating on this procedure any desired number of times. A general statement of the method is set forth below.

The basic procedure defines a first slant stack over a first group of $2^n$ offset traces at the given slopes $p = k\Delta p_n$ as $$A_n(k\Delta p_n, i\Delta \tau) \quad (12)$$

where $k = 0, 1, \cdots, 2^n$ and $\Delta p_n = (\tfrac{1}{2})^n \Delta t/\Delta x$; and, a second slant stack over an adjacent group of $2^n$ offset traces is defined by $$B_n(k\Delta p_n, i\Delta \tau) \quad (13)$$

for the like trace k and slope p values.

Given these values, the Fast Slant Stack (FSS) over the combined group of $2^{n+1}$ traces is given by $$\begin{aligned}&A_{n+1}(2k\Delta p_{n+1}, j\Delta \tau) \\ &= A_n(k\Delta p_n, j\Delta \tau) + B_n(k\Delta p_n, (j+k)\Delta \tau)\end{aligned} \quad (14)$$

and $$\begin{aligned}&A_{n+1}((2k+1)\Delta p_{n+1}, j\Delta \tau) \\ &= \tfrac{1}{2}[A_n(k\Delta p_n, j\Delta \tau) \\ &\quad ) + A_n((k+1)\Delta p_n, j\Delta \tau) + B_n(k\Delta p_n, (j+k+1)\Delta \tau) \\ &\quad + B_n((k+1)\Delta p_n, (j+k)\Delta \tau)]\end{aligned}$$

where $k = 0, 1, \cdots 2^n$ and $\Delta p_{n+1} = \tfrac{1}{2}\Delta p_n$.

This process may then be repeated interatively until any desired $\Delta p$ grid is achieved. That is, until the desired diminution of the $\Delta p$ sector slices within each unit grid boundary such that the data will yield a satisfactory transform of p—tau response.

For a Fast Slant Stack of $2^n$ traces, the slant stack is complete after n iterations giving $2^n$ slant stack traces for p values between 0 and $\Delta t/\Delta x$ as sampled at $\Delta p = (\tfrac{1}{2})^n \Delta t/\Delta x$. The flexibility of the Fast Slant Stack method can be increased by several different adjustments. First, the input data can be processed in small groups. For example, if there are 96 input traces, these can be processed as three groups of 32 traces ($2^5$) or six groups of 16 traces ($2^4$). Also, groups of traces can be padded with blank traces up to a total of such as 128 traces and processed as one group of 128 traces ($2^7$) or two groups of 64 traces ($2^6$). Each of these options will give a different p grid.

The multiple groups may then merge with no further interpolation into a final slant stack or p—tau display. Also, the range of p values can be extended by shifting the relative positions of the input traces. That is, if each trace is shifted by one sample per trace, then the fast slant stack will give p values in the range of $\Delta t/\Delta x$ to $2\Delta t/\Delta x$. Still further, the input data can be resampled to a different grid to completely change the basic unit of p. In fact, $\Delta t$ and $\Delta x$ could be adjusted in the field so that optimum use of Fast Slant Stack processing could be made for a given survey application.

Figure 4C:
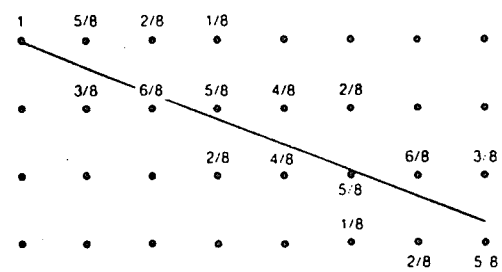
FIG. 4C illustrates a grid pattern and stacking weight distribution as may occur in the method of the present invention.
Figure 4C:

Finally, there is one point on the accuracy of the linear interpolation that needs to be mentioned. While the Fast Slant Stack will always give an exact interpolation if applied to a linear function, it does not always give the best interpolation for a non-linear function. That is, it sometimes will give a linear estimation based on more than just two adjacent grid points. For an exact function with constant curvature, this will always give a less accurate result. In the presence of noise, the better interpolation is a statistical question. One situation where such interpolation may occur is for $p = \frac{3}{8}\Delta t/\Delta x$ as shown in FIG. 4C. On two of the eight traces, the 4 and 6 columns, the correct $\frac{1}{2}:\frac{1}{2}$ weights are replaced by $\frac{1}{8}:\frac{5}{8}:2/8$ weights. Thus, the interpolated value will be estimated from the three nearest neighbors rather than just the two adjacent points. It is conceivable that this very small error could spread in large group fast slant stacks; however, the method at present has been run on a number of different large stacks and no visual difference has been observed in the output sections.

FIG. 5 illustrates the basic flow diagram for the Fast Slant Stack process. The initial stage 50 sees inputting of the trace data for whatever the selected terrain of interest. This would be a line of related seismic data that is preprocessed for certain dynamics and normal moveout through common depth point stacking to provide continuous, related traces. Flow stage 52 allows for selection of all of the input traces that are of interest for the particular procedure and these would be selected in multiples of $2^n$ since the Fast Slant Stack effectively operates on groups, multiples, or sub-multiples, of $2^n$ seismic traces. For example, processing of 128 continuous traces could be effected with $n=7$, i.e. $2^7=128$, or the processing could proceed through $n=6$ and two groups of 64 traces, $n=5$ and four groups of 32 traces, etc.

Flow stage 54 effects input of data relative to selection of slope p in terms of $\Delta t/\Delta x$. In this case, p is a variable value that changes with the value of n through the progression of data iterations. In flow stage 56, there is a first evaluation of slant stacks for successive pairs of traces to establish a grid of basic interpolation weights for slopes of $p=0$ and $p=\frac{1}{2}\Delta t/\Delta x$. This establishes the basic interpolation weights as one and $\frac{1}{2}:\frac{1}{2}$ as illustrated in FIG. 4A. These basic interpolation weights are then summed variously through the following procedures to establish the additional interpolation combination schemes within the unit weight.

Flow stage 58 illustrates the next merging of data step, the $n=2$ step, wherein two pairs of adjoining traces are merged into a group of four traces and the summation slope is again adjusted in the manner as shown in FIG. 4B. Referring to the case for $p=1\Delta p_2$, it can be seen that summation of base values taken from the FIG. 4A assemblage are readily constructed into a slope p grid having weights at the grid points of 1, $\frac{3}{4}:\frac{1}{4}$, $\frac{1}{2}:\frac{1}{2}$, and $\frac{1}{4}:\frac{3}{4}$, respectively.

The flow stage 60 illustrates the next phase of iterating the data merger for groups of traces progressing through the exponential powers of 2 until a sufficient number of iterations have been carried out to effect good slant stack resolution. In each case, as the exponent n increases, the slope p will further diminish the range of grid values in the sampling grid such as to make a more finite slope angle determination. Finally, all calculated and iterated data is output at flow stage 62 to form a display of the p—tau data parameters for further interpretive consideration. The p—tau output data has a number of applications wherein it is a useful tool for use in low velocity noise filtering, velocity analysis, deconvolution, removal of multiples, modeling and a number of other seismic data processing techniques that seek to define further specified parameters or effects within an earth structure.

The foregoing discloses a novel data processing technique that enables compilation of a slant stack of seismic data without undue expense due to exhaustive computer operations. The Fast Slant Stack method performs p—tau slant stack with a much reduced number of computer operations by means of establishing a basic sampling grid having p values specifically related to $\Delta t/\Delta x$ and thereafter iteratively merging additional trace data and slope grid values until a sufficient slant stack data indication is constructed. The process is much faster in operation and serves bring the fast slant stack data compilation into favorable use as a seismic data interpretation tool.

Changes may be made in combination and arrangement of elements as heretofor set forth in the specification and shown in the drawings; it being understood that changes may be made in the embodiments disclosed without departing from the spirit and scope of the invention as defined in the following claims.

The embodiments of the invention in which an exclusive property or privilege is claimed are as follows:

1. A method for fast slant stack of seismic data, comprising the steps of:
   inputting selected seismic data in the form of a plurality of spatially related traces having known offset x and time t;
   defining a sampling grid of slope p for the range 0 to $\Delta t/\Delta x$ in terms of $\Delta p_n = (\frac{1}{2})^n \Delta t/\Delta x$ wherein slope p is a variable value that changes with the value of n through a progression of n data iterations;
   evaluating first slant stacks of successive pairs of $2^1$ traces through time t for slopes 0 and $\frac{1}{2}\Delta t/\Delta x$ to establish basic interpolation weights of 1 and $\frac{1}{2}:\frac{1}{2}$ relative to the sampling grid;
   merging data from adjoining groups of $2^1$ slant stack traces into groups of $2^2$ slant stack traces having a sampling grid that is summed from the basic interpolation weights of 1 and $\frac{1}{2}:\frac{1}{2}$;
   repeating said merging step for successive adjoining groups of $2^2$ through $2^n$ slant stack traces through a total n interations whereupon sufficient refinement of the sampling grid is attained; and
   outputting a p—tau display of said selected seismic data.

2. A method as set forth in claim 1 wherein said step of evaluating comprises:
   deriving weights of 1 at the grid points and $\frac{1}{2}:\frac{1}{2}$ for points halfway between grid points of the slopes $p_0$ and $p_1$.

3. A method as set forth in claim 1 which is further characterized in that:
   the interpolation weights for $\Delta p_{n+1}$ are a linear combination of weights from $\Delta p_n$.

4. A method as set forth in claim 2 which is further characterized in that:
   the interpolation weights for $\Delta p_{n+1}$ are a linear combination of weights from $\Delta p_n$.

5. A method as set forth in claim 1 which further includes:
   inputting a multiple of groups of $2^n$ spatially related traces and processing through repeated iterative mergings.

6. A method as set forth in claim 5 wherein:
   said multiple of groups of related traces are serially aligned.

7. A method as set forth in claim 1 which further includes the step of:
   shifting each successive input trace by at least one sample per trace thereby to extend the total range of p values of said sampling grid.

8. A method as set forth in claim 7 which includes:
   shifting each successive input trace by one sample per trace so that the fast slant stack p—tau display gives p values in the range of $\Delta t/\Delta x$ to $2\Delta t\Delta x$.

* * * * *